M. McGLONE.
CLEAN-OUT FITTING.
APPLICATION FILED MAR. 7, 1916.
1,213,221. Patented Jan. 23, 1917.
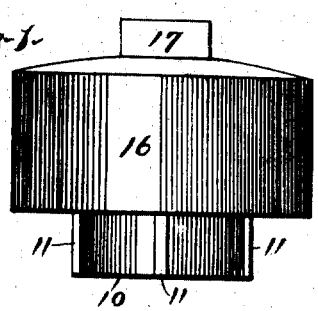
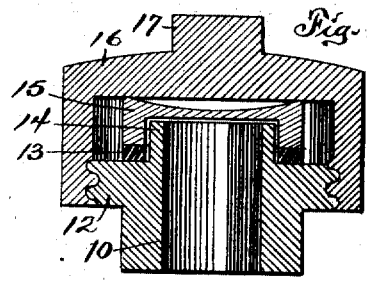
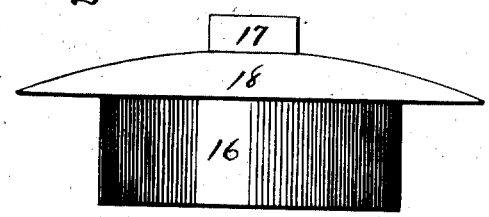
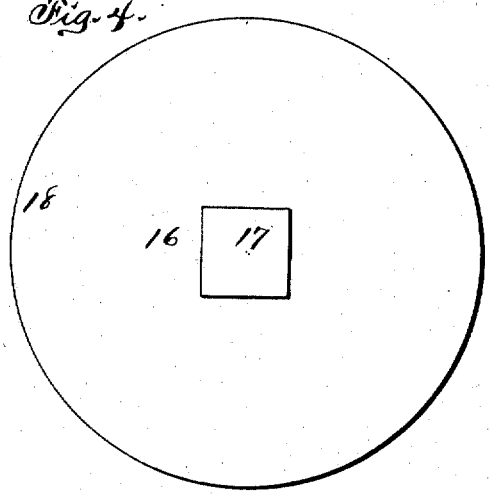
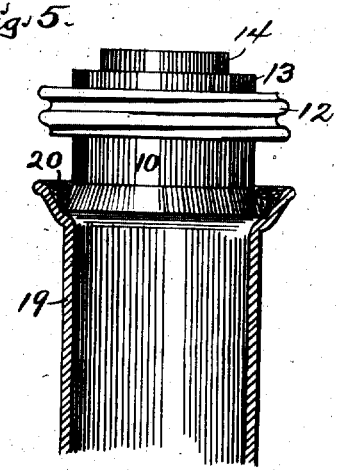
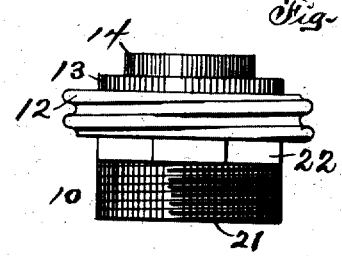
Attest:
H. G. Sweet
L. L. Leibrock
Inventor:
Martin McGlone
By Silas L. Sweet Atty

UNITED STATES PATENT OFFICE.

MARTIN McGLONE, OF DES MOINES, IOWA.

CLEAN-OUT FITTING.

1,213,221.

Specification of Letters Patent.   Patented Jan. 23, 1917.

Application filed March 7, 1916.   Serial No. 82,633.

*To all whom it may concern:*

Be it known that I, MARTIN McGLONE, citizen of the United States of America, and resident of Des Moines, Polk county, Iowa, have invented a new and useful Clean-Out Fitting, of which the following is a specification.

The object of this invention is to provide an improved construction for a fitting adapted to facilitate opening and closing a cleanout port to a trap, iron pipe or drain.

A further object of this invention is to provide improved means for preventing rusting and sticking together of various parts of a cleanout closure to such extent as to damage the parts when forcibly separated for the purpose of gaining access to the inclosed chamber.

A further object of this invention is to provide a construction of fittings that will permit a cleanout closure to be closed and opened manually without the aid of any tools other than the human hands, thus eliminating the risk of damage through forcible opening of adhering parts.

My invention consists in the construction, arrangement and combination of elements hereinafter set forth, pointed out in my claims and illustrated by the accompanying drawing, in which—

Figure 1 is a side view of one form of fitting, in closed relation of parts. Fig. 2 is a vertical section of Fig. 1. Fig. 3 is a side view and Fig. 4 a plan showing one of the parts in modified construction to provide a floor flange. Fig. 5 is an elevation, partly in section, showing the device with one part of modified construction adapting it for use in a calk-joint. Fig. 6 is a side view showing one of the parts in modified construction adapting it for use in screwed relation to an iron pipe.

In the construction of the device as shown in Figs. 1 and 2, the numeral 10 designates a tubular stem, preferably made of metal, such as iron, by molding, the bore of said stem being of uniform diameter throughout its length. The stem 10 may be formed with longitudinal ribs 11, or other engaging means, on its periphery, thus adapting said stem to be secured to a lead pipe or trap by a wiped joint of common form. Such connection may be made in any relation to the trap or pipe. The stem 10 is formed with a peripheral flange 12, which flange is formed with a course round thread on its periphery. A gasket 13 rests on the flange 12 and surrounds a tubular neck 14 formed on the stem. A cap 15 is mounted loosely over the neck 14 and rests on the gasket 13, the upper face of the cap being countersunk. A screw-cap 16 is mounted over the cap 15 and surrounds said cap and the neck 14 and gasket 13. The cap 16 is formed with an internal coarse round thread mating with the thread on the flange 12, and said cap also is formed with a wrench-head 17 centrally of its end and projecting outwardly therefrom. The screw-cap 16 is screwed on or unscrewed from the flange 12 manually. It is seated only to sufficient extent to compress the cap 15 on and into the gasket so as to make a tight joint between the flange 12 and latter cap. Moisture and fumes or sewer gas are prevented by said joint from contacting with the screw connection and said screw connection is coarse and round, as contra-distinguished from a fine sharp thread usually employed to exclude or confine moisture and fumes to make a tight joint, hence the pressure on the gasket need not be great and the connection can readily be moved by hand, as the screw will not stick and bind. When the screw connection does stick slightly, a light application of a wrench to the head 17 will be sufficient to release it without twisting the lead structure of the trap or pipe and damaging it. When the screw-cap 16 is removed by hand, as noted, the cap 15 may readily be removed from the gasket, it being loosened when required by a light blow with a hammer.

Sometimes the fitting may be used in a floor opening over a trap, and under such conditions a modified form of screw-cap is employed, as shown in Figs. 3 and 4, where a tapering peripheral flange 18 is formed on the upper end of the screw-cap adapted to overlie and close the hole in the floor.

The stem 10 may be formed, as shown in Fig. 5, and be inserted in an opening, such as the bell-mouth of an iron pipe 19, and be sealed in said opening by a calk-joint 20. The stem 10 may be formed with an ordinary joint-making thread 21 and a wrench-seat or nut 22 adjacent the flange 12, thus being adapted for screwing into a tapped opening of any character.

I do not desire to be limited to the construction and arrangement of the parts as shown and described, as the same may be modified in many particulars without departing from my invention.

I claim as my invention—

1. A cleanout fitting, comprising a stem adapted for mounting in an opening of pipe or trap, a peripheral flange on said stem, an annular gasket on said flange, a neck on the stem within the gasket, a cap on said gasket, and a screw-cap loosely overlying and inclosing the cap, neck and gasket and screwed on said flange.

2. A cleanout fitting, comprising a stem having a bore of uniform diameter throughout adapted for communication with an opening of trap or pipe, a peripheral flange on and projecting radially of said stem formed with a peripheral coarse screw, an annular gasket on said flange, a loose cap having a rim engaging on said gasket and a screw-cap screwed on said flange and adapted to press the loose cap to the gasket, said screw-cap inclosing the outer end of the stem, the loose cap and the gasket.

3. A cleanout fitting, comprising a stem having a bore of uniform diameter throughout adapted for communication with an opening of trap or pipe, a peripheral flange on and projecting radially of said stem formed with a peripheral coarse screw, a neck on said stem, a gasket on the flange surrounding said neck, a loose cap having a rim resting on said gasket and inclosing said neck, and a screw-cap loosely inclosing the neck, cap and gasket and screwed on said flange, said screw-cap being formed with a tapering peripheral flange.

Signed by me at Des Moines, Iowa, this 20th day of November, 1915.

MARTIN McGLONE.

Witnesses:
J. W. WHITE,
S. C. SWEET.